Oct. 12, 1948.　　　　R L. OHLS　　　　2,451,354
PIPE COUPLING
Filed Oct. 8, 1945
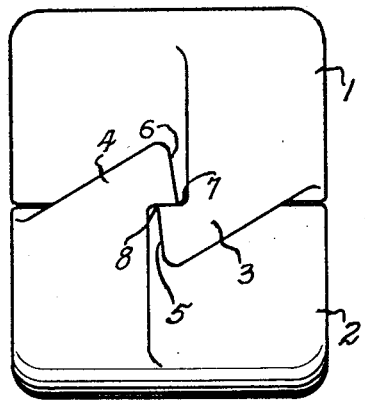
Fig. 1.
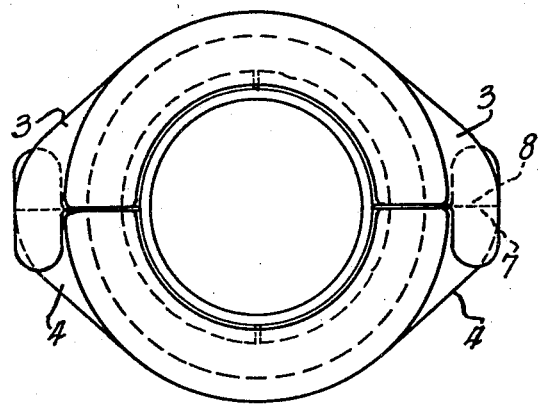
Fig. 2.
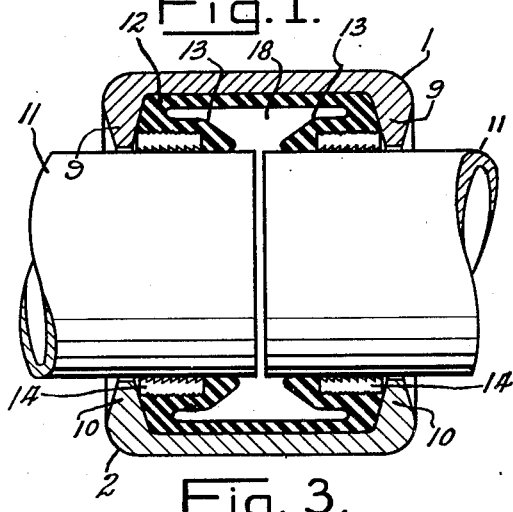
Fig. 3.
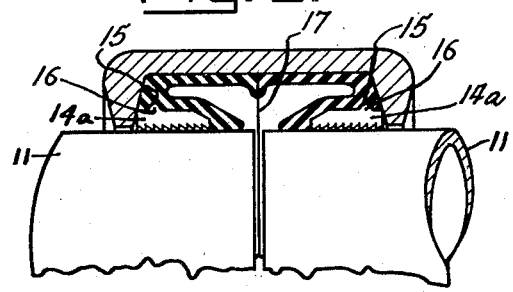
Fig. 4.
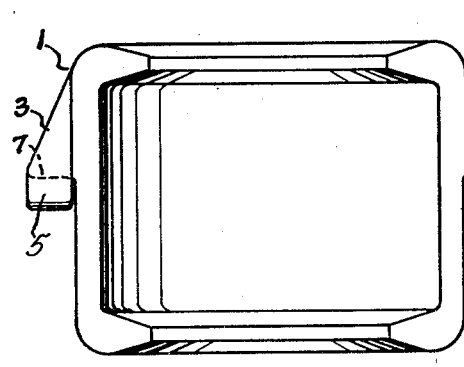
Fig. 5.
Fig. 6.
ROBERT L. OHLS
Inventor
By
E. V. Hardway
Attorney Patented Oct. 12, 1948

2,451,354

UNITED STATES PATENT OFFICE 2,451,354

PIPE COUPLING

Robert L. Ohls, Houston, Tex.

Application October 8, 1945, Serial No. 621,037

14 Claims. (Cl. 285—194)

This invention relates to a pipe coupling and has particular relation to a coupling for pipe having plain ends.

An object of the invention is to provide a sectional housing with novel means for securing the housing sections together.

Another object of the invention is to provide a coupling having a housing and a resilient gasket therein shaped to surround the pipe ends with jaws arranged within the gasket and held by it in engagement with the pipe to prevent separation of the pipe ends.

A further object of the invention is to provide a coupling of the character described whereby the pressure fluid escaping through the joint between the pipe ends will operate through the gasket to hold the jaws in secure engagement with the pipe ends.

It is a further object of the invention to provide, in a coupling, a novel type of gasket with pipe engaging jaws mounted within the gasket.

A still further object of the invention is to provide a gasket of the character described having external end ribs with a greater diameter than the inside diameter of the housing whereby the jaws within the gasket will be forced into engagement with the pipe ends upon application of the housing around the gasket.

With the above and other objects in view the invention has particular relation to certain novel features of construction, arrangement of parts and use, examples of which are given in this specification and illustrated in the accompanying drawings, wherein—

Figure 1 is a side view of the coupling.

Figure 2 is an end view.

Figure 3 is a longitudinal, sectional view as applied to the pipe ends and illustrating one form of the gasket.

Figure 4 is a fragmentary, longitudinal, sectional view thereof illustrating another form of the gasket.

Figure 5 is an inside view of one of the housing sections; and

Figure 6 is a fragmentary, sectional view of one form of the gasket.

Referring now more particularly to the drawings wherein like numerals of reference designate the same parts in each of the figures, the numeral 1 designates one of the housing sections and the numeral 2 designates the other housing section. These sections are of similar construction. The section 1 has two similar side hooks 3, 3 formed integrally therewith and the section 2 has two similar side hooks 4, 4 formed integrally therewith. These respective side hooks have the end faces 5, 5 and 6, 6 and the interlocking side faces 7, 7 and 8, 8. The housing sections also have the inside end flanges 9, 9 and 10, 10. The housing, when assembled, is shaped to closely suround the adjacent ends of the pipe sections 11, 11 to be connected.

The numeral 12 designates a gasket formed of resilient material and shaped to fit closely within the housing and to surround said pipe ends. The inside of the gasket has the inwardly turned annular lips 13, 13 which closely surround the adjacent ends of the pipe sections. The lips are of somewhat smaller inside diameter than the external diameter of the pipe ends so that when assembled with the pipe ends they will be stretched over said ends firmly to make definite seals.

Within the gasket, at each end, are the pipe engaging jaws 14 whose inner surfaces are toothed to engage the outer surface of the pipe ends. A plurality of jaws, preferably three, are inserted in each end of the gasket. They are arcuate in shape so as to fit around the pipe ends but have a small clearance between them so that they may contract.

In the form of gasket shown in Figures 3 and 6, the jaws are shown as molded in place when the gasket is molded; however, in the form shown in Figure 4, the gasket may be molded with inside end grooves 15 there around and the jaws 14a later inserted. In this case the jaws should have the external ribs 16 to fit into said grooves so that the jaws 14a will remain assembled with the gasket; also in either form the gasket may be molded in two separate pieces and then joined at the center 17 by cementing or otherwise to form a single unit. It may be stated that in either of the forms the jaws may be inserted after molding the gasket. They may be cemented in place or as an alternative the grooves 15 and ribs 16 may be used to hold them in place.

The gasket may be formed with the external annular end ribs 17, 17 there around as shown in Figure 6. These end ribs are opposite the jaws and the outside diameter of the ribs is greater than the inside diameter of the housing into which it is forced to fit. Accordingly, when the housing is applied the compression it exerts against the ribs and on the resilient gasket produces an initial pressure upon the jaws when the whole unit is assembled and forces the jaws to grip the pipe ends.

It will be noted that the inwardly turned lips 13, 13 partially enclose an annular chamber 18 within the gasket and the pressure fluid flowing through the connected line will escape through the joint into said chamber and will act against said lips to force the jaws into secure gripping relation with the pipe ends which increases as the pressure in the line increases.

In assembling the coupling the gasket is first fitted over the pipe ends. The two housing sections are then placed around the gasket and forced radially toward each other. The faces 5, 5 and 6, 6 co-act to slightly move the housing sections longitudinally in opposite directions thus slightly distorting the gasket until the apexes of the hooks clear each other whereupon the pressure of the gasket will force said sections back into alignment with the faces 7, 7 interengaging with the faces 8, 8 so as to interlock the sections together and they will be held in proper alignment by the gasket assisted by the fluid pressure within it.

Upon relief of the pressure in the gasket a suitable implement may be used to force the sections apart to disconnect the coupling to be placed on another location.

In making a connection only three parts are to be handled, that is the gasket and the two housing sections.

The drawings and description are illustrative merely while the broad principle of the invention will be defined by the appended claims.

What I claim is:

1. In a pipe coupling, a housing formed of two similar sections, a pair of side hooks on each section having side faces which are substantially parallel with the longitudinal axis of the assembled coupling and also having end faces which are at an acute angle to the corresponding side faces.

2. In a coupling, a housing formed of similar sections and shaped to surround pipe or a similarly shaped object, when assembled, a pair of similar side hooks on each section, the hooks of each section having faces arranged to co-act, when the sections are initially moved radially toward each other, in assembling them, to cause the sections to move also longitudinally in one direction relative to each other, said hooks also having faces arranged to thereafter interlock upon final longitudinal movement of the sections in the other direction.

3. In a coupling, a housing formed of similar, complemental, sections and shaped to surround pipe, or the like, when assembled, a pair of similar side hooks on each section, the hooks of one section being turned in a direction opposite to that of the hooks of the other section and the hooks of each section having faces adapted to interlock with the corresponding faces of the complemental section upon movement of the section to final assembled position and a yieldable gasket in the housing effective to hold said sections against relative longitudinal movement and to thereby maintain said hooks in interlocking relation.

4. A coupling for connecting the adjacent ends of pipe comprising, a yieldable gasket having inside, confronting lips shaped to surround said ends and extended toward each other to form an inside chamber in the gasket, pipe engaging jaws within said lips arranged to be forced radially inwardly by the lips upon application of pressure in the chambers to engage said ends and a rigid housing around the gasket.

5. A coupling for connecting the adjacent ends of pipe comprising, a yieldable, annular, gasket having overturned, confronting inside lips shaped to surround said ends and forming a chamber within the gasket, pipe engaging jaws on the inner sides of the lips arranged to be forded radially inwardly into engagement with the pipe ends by pressure in the chamber and a housing around the gasket.

6. A coupling for connecting the adjacent ends of pipe comprising, a yieldable gasket having inside, confronting lips shaped to surround the pipe ends, jaws arranged around the inner sides of each of the lips, external elevations on the gasket opposite the jaws, a housing assembled around the gasket and applying pressure to the elevations and through said elevations to the jaws, to cause the jaws to grip the pipe ends.

7. In a coupling for pipe, a sleeve-like gasket having inside, annular, lips turned toward each other and pipe engaging jaws wholly within the ends of the gasket and extending within the lips.

8. In a coupling for pipe, a sleeve-like gasket having inside, confronting, annular lips, pipe engaging jaws arranged in the ends of the gasket and extended within the lips, the adjacent parts of the gasket and jaws being provided, one with arcuate ribs and the other with corresponding recesses to receive the ribs to retain the jaws in the gasket.

9. In a coupling for pipe, a sleeve-like gasket having inside, confronting, annular lips enclosing an inside, annular, chamber, pipe engaging jaws arranged in the ends of the gasket and extending within and enclosed by the lips, the adjacent parts of each jaw and the gasket being provided, one with a projection and the other with a recess to receive the projection to retain the jaws in the gasket.

10. A pipe coupling for connecting the adjacent ends of pipe comprising, a resilient gasket shaped to receive said ends, a housing formed of sections of rigid material and shaped to surround the outer sides and ends of the gasket, said sections having similar side hooks provided with tapering faces which co-act, when the sections are fitted onto the gasket and moved radially toward each other, to initially move the sections longitudinally, in opposite directions, to distort the gasket and said sections being provided with other interlocking faces arranged to be moved into final interlocking relation by the pressure of the distorted gasket.

11. A coupling for connecting the adjacent ends of pipe comprising, a yieldable gasket having inside, confronting lips shaped to surround the pipe ends, jaws arranged around the inner sides of the lips, external elevations on the gasket opposite the jaws, a housing assembled around the gasket and applying pressure radially inwardly to the elevations and, through said elevations, to the jaws to cause the jaws to grip the pipe ends.

12. A coupling for connecting the adjacent ends of pipe comprising, a yieldable gasket having inside, confronting lips shaped to surround the pipe ends and enclosing an inside, annular, chamber, pipe engaging jaws enclosed within the ends of the gasket and extending within the lips and surrounding the pipe ends, a housing assembled around the gasket, the ends of the gasket being formed with surplus material which is subjected to pressure by the housing when the housing is assembled around the gasket to cause an initial compressive force to be applied to the jaws radially inwardly to cause said jaws to grip the corresponding pipe ends, said lips being arranged to be subjected to pressure within said chamber to force said lips and jaws radially inwardly to cause the jaws to grip the pipe ends.

13. A coupling for connecting the adjacent ends of pipe comprising, a yieldable gasket having inside confronting lips shaped to surround the pipe ends and enclosing an inside chamber which is open to the interior of the pipe, pipe engaging jaws arranged within the ends of the gasket and extending within the lips and surrounding the pipe ends, a housing assembled around the gasket, means within the housing which subjects pressure, by the housing, to the ends of the gasket, when the housing is assembled around the gasket, to cause an initial compressive force to be applied by the gasket to the jaws radially inwardly to cause said jaws to grip the corresponding pipe ends, said lips, when subjected to pressure within the chamber, also forming means for forcing the jaws radially inwardly to cause the jaws to grip the pipe ends and means on the housing sections which interlock and are maintained in interlocking relation by the gasket when the gasket is under said pressure in said chamber.

14. A pipe coupling for connecting the adjacent ends of pipe comprising, a resilient gasket shaped to receive said ends, a housing formed of longitudinal sections of rigid material and shaped to surround the outer side of the gasket and having inside end flanges at the ends of the gasket, said sections having similar side hooks provided with tapering faces which coact, when the sections are fitted onto the gasket and moved radially toward each other, to initially move the sections longitudinally, relative to each other, in opposite directions and out of alignment, said flanges being arranged to engage opposing ends of the gasket to distort the gasket, upon such relative longitudinal movement, and said hooks being provided with other interlocking faces arranged to move, longitudinally relative to each other, into final interlocking relation as said housing sections are moved longitudinally into alignment by the pressure of the distorted gasket.

ROBERT L. OHLS.

REFERENCES CITED

The following references are of record in the file of this patent:

UNITED STATES PATENTS

| Number | Name | Date |
|---|---|---|
| 725,610 | Wossoff | Apr. 14, 1903 |
| 1,646,660 | Prince | Oct. 25, 1927 |
| 2,225,208 | Crickmer | Dec. 17, 1940 |
| 2,226,304 | Dillon | Dec. 24, 1940 |
| 2,230,725 | Nathan | Feb. 4, 1941 |